United States Patent
Varma et al.

(10) Patent No.: US 11,429,564 B2
(45) Date of Patent: Aug. 30, 2022

(54) FILE TRANSFERRING USING ARTIFICIAL INTELLIGENCE

(71) Applicant: BANK OF AMERICA CORPORATION, Charlotte, NC (US)

(72) Inventors: Jayachandra Varma, Irving, TX (US); Balaji Subramanian, Coppell, TX (US); Anshika Choudhary, Ajmer (IN); Manu J. Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 698 days.

(21) Appl. No.: 16/445,015

(22) Filed: Jun. 18, 2019

(65) Prior Publication Data

US 2020/0401559 A1 Dec. 24, 2020

(51) Int. Cl.

| | |
|---|---|
| *G06F 15/16* | (2006.01) |
| *G06F 16/17* | (2019.01) |
| *G06F 11/14* | (2006.01) |
| *G06F 16/182* | (2019.01) |
| *H04L 67/1097* | (2022.01) |
| *G06F 40/279* | (2020.01) |

(52) U.S. Cl.
CPC ...... *G06F 16/1727* (2019.01); *G06F 11/1448* (2013.01); *G06F 11/1469* (2013.01); *G06F 16/182* (2019.01); *G06F 40/279* (2020.01); *H04L 67/1097* (2013.01); *G06F 2201/80* (2013.01); *G06F 2201/82* (2013.01)

(58) Field of Classification Search
None
See application file for complete search history.

(56) References Cited

U.S. PATENT DOCUMENTS

| | | |
|---|---|---|
| 4,636,974 A | 1/1987 | Griffin |
| 4,825,354 A | 4/1989 | Agrawal et al. |
| 4,887,204 A | 12/1989 | Johnson et al. |
| 4,897,781 A | 1/1990 | Chang et al. |
| 5,124,987 A | 6/1992 | Milligan et al. |
| 5,214,768 A | 5/1993 | Martin et al. |
| 5,440,737 A | 8/1995 | Uchinuma |
| 5,450,584 A | 9/1995 | Sekiguchi et al. |

(Continued)

FOREIGN PATENT DOCUMENTS

| | | |
|---|---|---|
| CN | 108829343 A | 11/2018 |
| EP | 0515073 A2 | 11/1992 |

(Continued)

*Primary Examiner* — Alex Gofman (57) ABSTRACT

A file transfer system that includes a data source, a destination device, and a transfer server. The transfer server is configured to receive a file from the data source and determine a file size of the file. The transfer server is further configured to determine an available disk space for the destination device, to compare the available disk space to the file size of the file, and to determine that the available disk space is less than the file size of the file. In response to the determination, the transfer server is further configured to determine a file type for the file based on content within the file and to identify metadata linked with the determined file type. The transfer server is further configured to extract data from the file corresponding with the identified metadata and to send the data to the destination device.

18 Claims, 4 Drawing Sheets

(56) References Cited

U.S. PATENT DOCUMENTS

| | | |
|---|---|---|
| 5,564,037 A | 10/1996 | Lam |
| 5,566,331 A | 10/1996 | Irwin, Jr. et al. |
| 5,568,629 A | 10/1996 | Gentry et al. |
| 5,650,969 A | 7/1997 | Niijima et al. |
| 5,685,010 A | 11/1997 | Yoda |
| 5,712,970 A | 1/1998 | Arnott et al. |
| 5,715,457 A | 2/1998 | Wakatani |
| 5,799,140 A | 8/1998 | Niijima et al. |
| 5,823,499 A | 11/1998 | Gustman |
| 5,862,312 A | 1/1999 | Mann et al. |
| 5,931,918 A | 8/1999 | Row et al. |
| 6,023,552 A | 2/2000 | Kunihiro |
| 6,317,808 B1 | 11/2001 | Berenshteyn |
| 6,574,709 B1 | 6/2003 | Skazinski et al. |
| 6,658,439 B2 | 12/2003 | Karasudani |
| 6,795,850 B2 | 9/2004 | Wu et al. |
| 6,842,829 B1 | 1/2005 | Nichols et al. |
| 6,928,521 B1 | 8/2005 | Burton et al. |
| 6,990,667 B2 | 1/2006 | Ulrich et al. |
| 7,117,310 B2 | 10/2006 | Chatterjee et al. |
| 7,685,312 B1 | 3/2010 | Caronni et al. |
| 7,730,038 B1 | 6/2010 | Caronni et al. |
| 10,164,901 B2 | 12/2018 | Gomatam et al. |
| 2006/0149997 A1* | 7/2006 | Chai ............... G06F 11/1469 714/E11.122 |
| 2012/0005307 A1* | 1/2012 | Das ............... G06F 16/1727 709/219 |
| 2012/0151067 A1* | 6/2012 | Piccinini ............ H04W 4/023 709/227 |
| 2012/0254364 A1* | 10/2012 | Vijayan ............ H04L 12/2803 709/219 |
| 2015/0350323 A1 | 12/2015 | Chinn et al. |
| 2016/0034539 A1* | 2/2016 | Yoon ................ G06F 16/164 707/769 |
| 2017/0024641 A1 | 1/2017 | Wierzynski |
| 2017/0060893 A1* | 3/2017 | Taveniku ........... G06F 16/168 |
| 2017/0060945 A1* | 3/2017 | Bastide ........... G06F 16/24542 |
| 2018/0336061 A1* | 11/2018 | Bower, III ........... G06F 3/0643 |

FOREIGN PATENT DOCUMENTS

| | | |
|---|---|---|
| EP | 0532335 A1 | 3/1993 |
| EP | 0757317 A2 | 2/1997 |
| EP | 1044404 A1 | 10/2000 |
| WO | 8903086 A1 | 4/1989 |

* cited by examiner

FILE TRANSFERRING USING ARTIFICIAL INTELLIGENCE

TECHNICAL FIELD

The present disclosure relates generally to file transferring, and more specifically to file transferring in a computer network using artificial intelligence.

BACKGROUND

In a computer network, data is routinely being processed and transferred between different computing devices. As a computing device receives information over time, the computing device's memory resources (e.g. available disk space) are gradually consumed and reduced. Eventually, the computing device's memory resource may become so low that the computing device is no longer able to receive or store new data from other computing devices. In existing systems, file transmissions begin to fail when the receiving computing device has an insufficient amount of memory resources available. As file transfer begins to fail, a bottleneck is formed as other computing devices continue to try to send data to the computing device that is low on memory resources. This bottleneck reduces the flow of data through a computer system which degrades the throughput and performance of the system and may cause the system to come to a halt. In addition, the bandwidth of the computer network also reduces as the computing devices attempt to resend data after a file transmission fails.

SUMMARY

In a computer network, data is routinely being processed and transferred between different computing devices. As a computing device receives information over time, the computing device's memory resources (e.g. available disk space) are gradually consumed and reduced. Eventually, the computing device's memory resource may become so low that the computing device is no longer able to receive or store new data from other computing devices. In existing systems, file transmissions begin to fail when the receiving computing device has an insufficient amount of memory resources available. As file transfer begins to fail, a bottleneck is formed as other computing devices continue to try to send data to the computing device that is low on memory resources. This bottleneck reduces the flow of data through a computer system which degrades the throughput and performance of the system and may cause the system to come to a halt. In addition, the bandwidth of the computer network also reduces as the computing devices attempt to resend data after a file transmission fails. Thus, it is desirable to provide a technical solution for transferring files when memory resources are low.

The system disclosed in the present application provides a technical solution to the technical problems discussed above by using artificial intelligence to transfer files between devices in a computer system. The disclosed system provides several practical applications and technical advantages which include 1) a file transfer process that uses artificial intelligence to dynamically determine how to communicate files between computing devices based on the available disk space of a receiving device, and 2) a file transfer process that reduces bottlenecks in a computer network by adjusting the amount of data that is transmitted to a computing device based on the available disk space of a receiving device.

In one embodiment, a file transfer system comprises a transfer server that is configured to communicate files between data sources and destination devices. The transfer server is configured to receive a file from a data source and to determine the file size of the file. The transfer server is further configured to identify a destination device for the file and to determine an amount of available disk space for the identified destination device. The transfer server then compares the file size of the file to the available disk space for the destination device to determine how to transmit the file to the destination device.

When the available disk space of the destination device is greater than the file size of the file, the transfer server may send the complete file to the destination device. When the available disk space of the destination device is less than the file size of the file, the transfer server may extract data from the file and send the extracted data from the file to the destination device instead of sending the complete file to the destination device. For example, the transfer server may determine a file type for the file. The transfer server may determine the file type for the file based on the format of the file and/or the content within the file. The transfer server then identifies metadata that is linked with the determined file type. The metadata identifies types of information to extract from the file for the destination device. For example, the metadata may identify information that is important or a high-priority to a destination device. The transfer server extracts data from the file that is important to the destination device based on the metadata and sends the extracted data to the destination device. This process allows the transfer server to extract a subset of the data from the file that is important to the destination device which reduces the amount of data that is transmitted to the destination device. This process provides a technical benefit over existing approaches which would create a bottleneck by attempting to send the complete file to the destination device even though the destination device lacks the available disk space to receive the file. In contrast, the transfer server is able to dynamically adjust the amount of data that is transmitted to the destination device based on the available disk space of the destination device.

When the available disk space for the destination device is below a minimum threshold value, the transfer server may be further configured to store the file in a database and to send a link for accessing the file to the destination device instead of sending the file or extracted data from the file to the destination device. The link allows the destination device to retrieve the file at a later time when the available disk space for the destination device increases. This process allows the transfer server to adjust how to communicate the file to the destination device based on the available disk space of the destination device.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system disclosed in the present application provides a technical solution to the technical problems discussed above by using artificial intelligence to transfer files between devices in a computer system. The disclosed system provides several practical applications and technical advantages which include 1) a file transfer process that uses artificial intelligence to dynamically determine how to communicate files between computing devices based on the available disk space of a receiving device, and 2) a file transfer process that reduces bottlenecks in a computer network by adjusting the amount of data that is transmitted to a computing device based on the available disk space of a receiving device.

In one embodiment, a file transfer system comprises a transfer server that is configured to communicate files between data sources and destination devices. The transfer server is configured to receive a file from a data source and to determine the file size of the file. The transfer server is further configured to identify a destination device for the file and to determine an amount of available disk space for the identified destination device. The transfer server then compares the file size of the file to the available disk space for the destination device to determine how to transmit the file to the destination device.

When the available disk space of the destination device is greater than the file size of the file, the transfer server may send the complete file to the destination device. When the available disk space of the destination device is less than the file size of the file, the transfer server may extract data from the file and send the extracted data from the file to the destination device instead of sending the complete file to the destination device. For example, the transfer server may determine a file type for the file. The transfer server may determine the file type for the file based on the format of the file and/or the content within the file. The transfer server then identifies metadata that is linked with the determined file type. The metadata identifies types of information to extract from the file for the destination device. For example, the metadata may identify information that is important or a high-priority to a destination device. The transfer server extracts data from the file that is important to the destination device based on the metadata and sends the extracted data to the destination device. This process allows the transfer server to extract a subset of the data from the file that is important to the destination device which reduces the amount of data that is transmitted to the destination device. This process provides a technical benefit over existing approaches which would create a bottleneck by attempting to send the complete file to the destination device even though the destination device lacks the available disk space to receive the file. In contrast, the transfer server is able to dynamically adjust the amount of data that is transmitted to the destination device based on the available disk space of the destination device.

When the available disk space for the destination device is below a minimum threshold value, the transfer server may be further configured to store the file in a database and to send a link for accessing the file to the destination device instead of sending the file or extracted data from the file to the destination device. The link allows the destination device to retrieve the file at a later time when the available disk space for the destination device increases. This process allows the transfer server to adjust how to communicate the file to the destination device based on the available disk space of the destination device.

System Architecture

Figure 1:
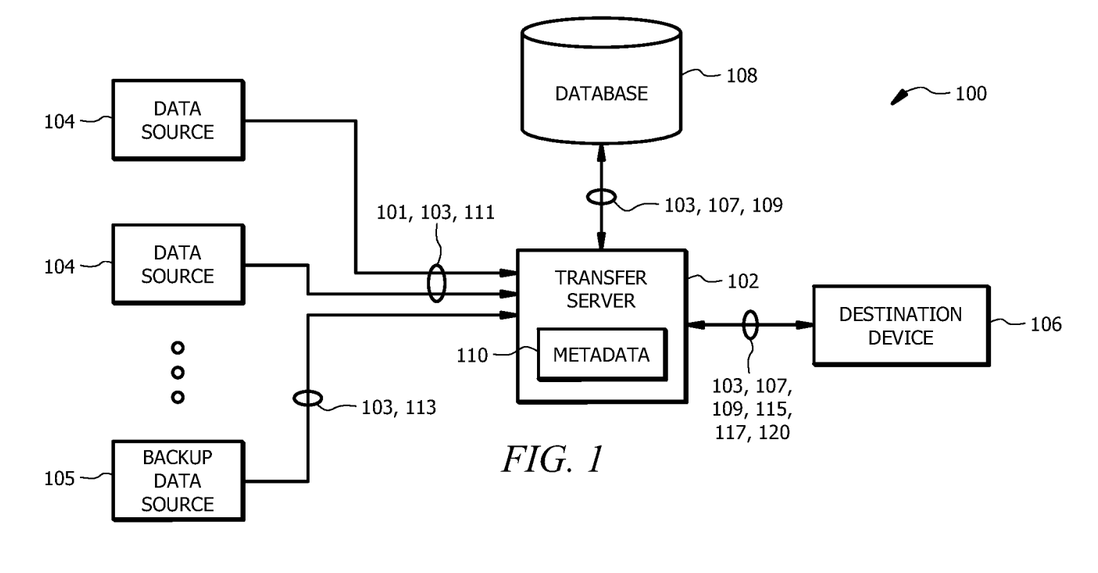
FIG. 1 is a schematic diagram of an embodiment of a file transfer system configured to employ artificial intelligence.

FIG. 1 is a schematic diagram of an embodiment of a file transfer system 100 that is configured to employ artificial intelligence to transmit files between devices. In one embodiment, the file transfer system 100 comprises a transfer server 102 that is in signal communication with one or more data sources 104, one or more backup data sources 105, one or more databases 108, and one or more destination devices 106. The file transfer system 100 may be configured as shown or in any other suitable configuration.

Transfer Server

The transfer server 102 may be formed by one or more physical devices configured to provide file transferring services and resources (e.g. hardware resources) for the file transfer system 100. The transfer server 102 may be configured as a proxy server that acts as an intermediary for communicating data (e.g. files 103) from a data source 104 to a destination device 106. An example of the transfer server 102 in operation is described in FIG. 2. Additional information about the transfer server 102 is described in FIG. 4.

The transfer server 102 is in signal communication with other devices in the file transfer system 100 using network connections. The network may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network may be configured to support any suitable type of communication protocol as would be appreciated by one of ordinary skill in the art.

The transfer server 102 is generally configured to employ artificial intelligence to determine how to transfer files 103 from a data source 104 to a destination device 106. Examples of files 103 include, but are not limited to, text files, text documents, spreadsheets, database records, video files, audio files, images, and/or any other type of data. A file 103 may comprise one or more documents. For example, a file 103 may comprise one or more text documents, spreadsheets, video files, audio files, images, or database records.

The transfer server 102 may be configured to communicate with a destination device 106 to determine its available disk space before transmitting any files 103 to the destination device 106. The transfer server 102 may then use artificial intelligence to determine how to transfer a file 103 to the destination device 106 based on its available disk space. The transfer server 102 may be configured to send the complete file 103 to the destination device 106 when the destination device 106 has a suitable amount of available disk space for the file 103.

The transfer server 102 may be configured to extract a portion of the data 107 from the file 103 and to send the extracted data 107 to the destination device 106 when the destination device 106 does not have a suitable amount of available disk space for the complete file 103. In this case, the transfer server 102 may be configured to extract data 107 from the file 103 based on its file type. File types may be identified based on the format of file 103 (e.g. a text document, a spreadsheet, video files, audio files, images, or a database record) and/or the content within the file 103. Examples of file types include, but are not limited to, data logs, legal documents, account summaries, resumes, financial statements, financial records, emails, letters, presentations, network logs, reports, or any other suitable type of file. The transfer server 102 is configured to identify metadata 110 that is linked with the file type of a file 103 and to use natural language processing to extract data 107 from the file 103 that corresponds with the identified metadata 110. Metadata 110 may be linked with different file types and may be used to identify different types of information to extract from a file 103 based on the file type.

In one embodiment, the metadata 110 may identify keywords or concepts that corresponds with the different types of information to extract from a file 103. For instance, the metadata 110 may use keywords to identify information that is important or has a higher priority than other information within a file 103. The transfer server 102 may use the keywords provided by the metadata 110 as a guide for identifying data 107 to extract from a file 103.

As an example, the transfer server 102 may determine that a file 103 has a file type that corresponds with a resume. The resume file type may be linked with metadata 110 that identifies the keywords "contact information" and "work experience." In this example, the transfer server 102 extracts data 107 that corresponds with the contact information and work experience from the resume. The transfer server 102 may be configured to use optical character recognition, text recognition, text parsing, text segmentation, and/or any other suitable type of natural language processing technique to identify and extract data 107 from the file 103. As another example, the transfer server 102 may determine that a file 103 has a file type that corresponds with a financial record. The financial record may comprise transaction information for a set of customers. The financial records file type may be linked with metadata 110 that identifies a subset of customers from the set of customers. In this example, the transfer server 102 may only extract data 107 associated with the identified customers.

In some embodiments, the metadata 110 may be specific to particular destination device 106. In this case, a destination device 106 may be associated with metadata 110 that identifies information that the destination device 106 would like to receive in the event that the destination device 106 does not have enough available disk space for a complete file 103. As an example, a first destination device 106 may be associated with metadata 110 that identifies a first set of keywords or concepts (e.g. education and technical skills) from a resume file type that are important to the first destination device 106. A second destination device 106 may be associated with metadata 110 that identifies a second set of keywords or concepts (e.g. work experience and career objectives) from a resume file type that are important to the second destination device 106. This process allows the transfer server 102 to identify the types of information that are important to each destination device 106 based on the metadata 110 that is associated with each destination device 106.

The transfer server 102 sends the extracted data 107 to the destination device 106 instead of sending the whole file 103 to the destination device 106. This process allows the transfer server 102 to send only a portion of a file 103 to the destination device 106 when the destination device 106 does not have enough available disk space for the complete file 103.

When the available disk space for the destination device 106 is below a minimum threshold value, the transfer server 102 may be further configured to store the file 103 in a database (e.g. database 108 or memory 404) and to send a link 109 for accessing the file 103 to the destination device 106 instead of sending the file 103 or extracted data 107 from the file 103 to the destination device 106. The link 109 allows the destination device 106 to retrieve the file 103 at a later time when the available disk space for the destination device 106 increases. This process allows the transfer server 102 to adjust how to communicate the file 103 to the destination device 16 based on the available disk space of the destination device 106.

In one embodiment, the transfer server 102 may be configured to determine the available disk space for multiple destination devices 106 when the destination devices 106 are connected in series. For example, the transfer server 102 may be configured to the determine the available disk space for a first destination device 106, a second destination device 106, and so on when determining how to transmit data to a destination server 106 that is down stream of several other destination devices 106 that are connected in series. Here, the transfer server 102 takes into consideration the available disk space of the destination devices 106 along the path the target destination device 106 to ensure that these devices have the available disk space to receive and transmit data to the target destination device 106.

Data Sources

Examples of data sources 104 include, but are not limited to, computing devices, databases, memories, servers, the Internet, or any other suitable type of device. The file transfer system 100 may comprise any suitable number of data sources 104 in signal communication with the transfer server 102. Data sources 104 may be in signal communication with the transfer server 102 using any suitable type of wired or wireless connection and/or communication protocol.

Each data source 104 is configured to send files 103 to the transfer server 102. A file 103 may comprise one or more documents. In one embodiment, data sources 104 may be configured to send messages 101 that comprise one or more files 103. The message 101 may comprise a header that identifies a destination device 106 for the one or more file 103. The header may identify a target destination device 106 using a media access control (MAC) address, an Internet protocol (IP) address, or any other suitable type of identifier. Examples of a message 101 includes, but is not limited to, an email.

In one embodiment, a data source 104 is configured to periodically send files 103 to the transfer server 102. For example, a data source 104 may be configured to send files 103 to the transfer server 102 at predetermined time intervals (e.g. hourly or daily). In another embodiment, a data source 104 may be configured to send files 103 in response to a data request 111 from the transfer server 102. In another embodiment, a data source 104 may be configured to send files 103 on-demand. For example, a data source 104 may send a file 103 in response to a user initiating a file transfer process to a destination device 106.

Backup data sources 105 are configured similar to the data sources 104. Backup data sources 105 are configured as a redundant data source for providing files 103 in the event that a file 103 from a data source 104 becomes corrupt or is missing information. In the event that the transfer server 102 determines that a file 103 from a data source 104 is corrupt or is missing data, the transfer server 102 may request a copy of a file 103 from a backup data source 105. The request may comprise a file name, a file version, an identifier for the original data source 104, and/or any other suitable type of information associated with the file 103. In this case, the backup data source 105 may be configured to process the request to identify the requested file 103, obtain a copy of the requested file 103, and send the copy of the requested file 103 to the transfer server 102.

Databases

In one embodiment, the database 108 is a device that is external from the transfer server 102. For example, the database 108 may be a data store, a server, a network attached storage (NAS) device, a computing device, a shared folder, or any other suitable type of network device. In another embodiment, the database 108 may be integrated within a memory (e.g. memory 404) of the transfer server 102. The database 108 comprises a memory configured to store metadata 110, files 103, extracted data 107, and/or any other suitable type of data.

In one embodiment, data stored in the database 108 may be accessed (e.g. downloaded) using a link 109. Examples of link 109 include, but are not limited to, a hyperlink and a File Transfer Protocol (FTP) link. For example, the transfer server 102 may be configured to generate or obtain a link 109 for accessing files 103 stored in the database 108. This process allows the transfer server 102 to send links 109 to the destination device 106 which only consumes a relatively small amount of memory resources instead of sending files 103 which may consume a significant amount of memory resources.

Destination Devices

Examples of destination devices 106 include, but are not limited to, computing devices, databases, memories, hard drives, flash drives, servers, cloud servers, NAS devices, or any other suitable type of data storing device. The file transfer system 100 may comprise any suitable number of destination devices 106 in signal communication with the transfer server 102. Destination devices 106 may be in signal communication with the transfer server 102 using any suitable type of wired or wireless connection and/or communication protocol.

In one embodiment, the file transfer system 100 may comprise a plurality of destination devices 106 connected in series. In this configuration data may be transferred from a first destination device 106 to a second destination device 106 and so on.

Destination devices 106 are configured to receive files 103, extracted data 107 from files 103, links 109 to files 103, and/or any other type of data from the transfer server 102. Destination devices 106 are configured to send information about their available disk space to the transfer server 102. For example, a destination device 106 may send information to the transfer server 102 that indicates that the destination device 106 has 100 megabytes of available disk space. In other examples, the destination device 106 may indicate its available disk space in any other suitable type of units, for example, kilobytes or gigabytes. A destination device 106 may be configured to periodically send information about their available disk space to the transfer server 102. For example, a destination device 106 may be configured to send information about its available disk space to the transfer server 102 in real-time or at predetermined time intervals (e.g. hourly or daily). As another example, a destination device 106 may be configured to send information about its available disk space in response to a request from the transfer server 102.

A destination device 106 may be configured to send information to the transfer server 102 that identifies the type of data that is important to the destination device 106. For example, a destination device 106 may be configured to send the transfer server 102 a set of keywords or concepts that are important to the destination device 106. In this case, the transfer server 102 may store the set of keywords or concepts as metadata 110 associated with the destination device 106. As another example, the destination device 106 may also send priority information that indicates a priority or level of importance among the provided keywords or concepts. This process allows destination device 106 to specify which types of information are important to the destination device 106. This allows the transfer server 102 to extract and send the important information to the destination device 106 rather than sending an entire file 103 in the event that the destination device 106 is low on memory resources.

File Transferring Using Artificial Intelligence

Figure 2:
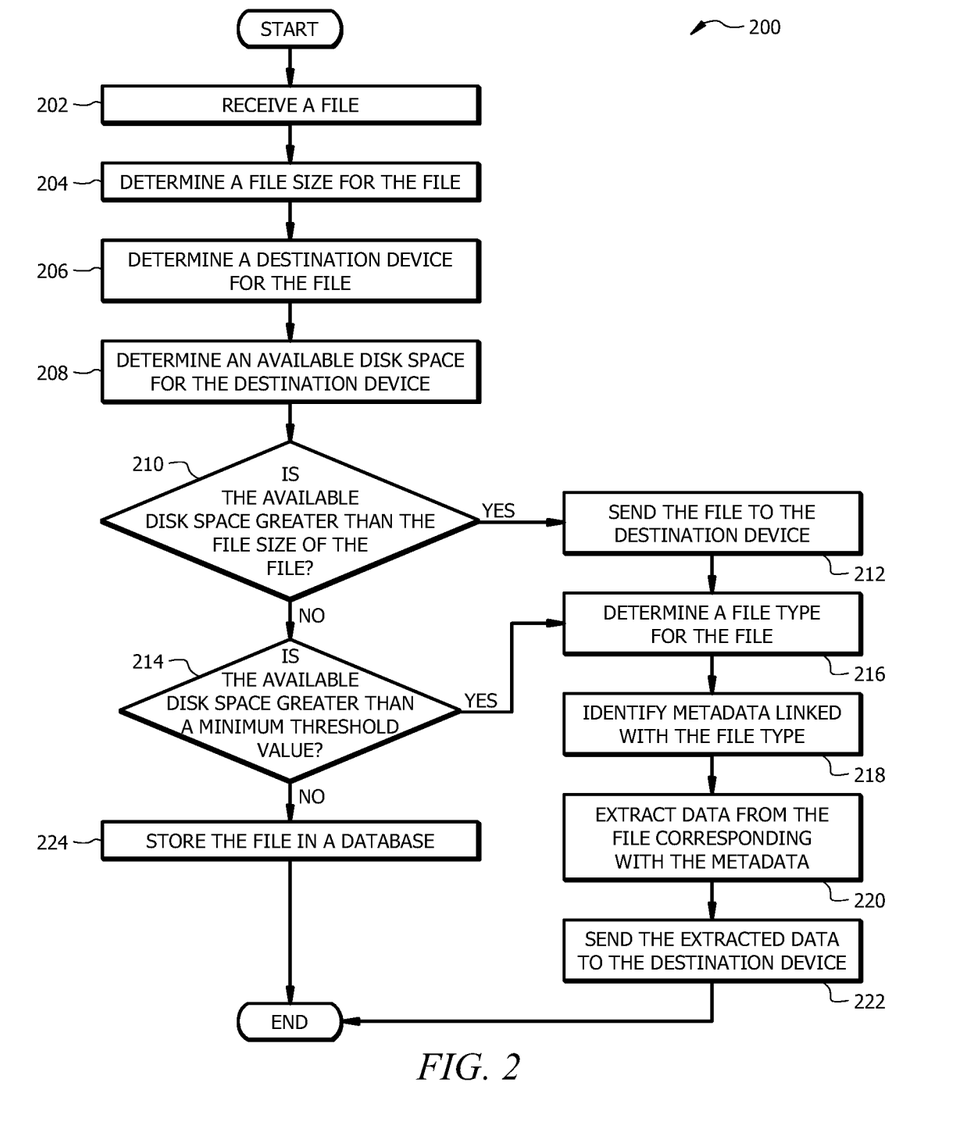
FIG. 2 is an embodiment of a flowchart of a file transfer method using artificial intelligence.

FIG. 2 is an embodiment of a flowchart of a file transfer method 200 using artificial intelligence. Method 200 may be employed by the transfer server 102 to communicate files 103 between data sources 104 and destination devices 106. The following is a non-limiting example where a transfer server 102 facilitates transferring a single file 103 from a data source 104 to a destination device 106. In other examples, the transfer server 102 may transfer any other suitable number of files 103 from a data source 104 to a destination device 106.

At step 202, the transfer server 102 receives a file 103 from a data source 104. For example, the transfer server 102 may receive a file 103 at predetermined time intervals (e.g. hourly or daily) from the data source 104. As another example, the transfer server 102 may send a data request 111 to the data source 104 and the data source 104 may send files 103 in response to receiving the data request 111. As another example, the transfer server 102 may receive the file 103 in responds to a user initiating a file transfer process using the data source 104.

In one embodiment, the transfer server 102 may analyze the file 103 to determine whether the file 103 is corrupt or missing information. For example, the transfer server 102 may open the file 103 to determine whether the file 103 opens without any errors or formatting issues. In the event that the transfer server 102 determines that the file 103 is corrupt or is missing data, the transfer server 102 may send a request 113 that identifies the file 103 to a backup data source 105 to request another copy of the file 103. In this case, the backup data source 105 processes the request 113 and sends a copy of the requested file 103 to the transfer server 102.

At step 204, the transfer server 102 determines a file size for the file 103. Here, the transfer server 102 may analyze the file 103 to determine its file size. The transfer server 102 may determine the file size of the file 103 in units of kilobytes, megabytes, gigabytes, or any other suitable units. The transfer server 102 may determine the file size of the file 103 using any suitable technique as would be appreciated by one of ordinary skill in the art. As an example, the transfer server 102 may determine that the file size of the file 103 is about ten megabytes. In the case where a file 103 comprises multiple documents, the transfer server 102 may also determine the file size of the documents within the file 103 as well as the file size of the whole file 103. For instance, the transfer server 102 may determine that the file 103 comprises five documents that are each about two megabytes in size.

At step 206, the transfer server 102 determines a destination device 106 for the file 103. For example, the file 103 may comprise a header that identifies a target destination device 106. The header may identify the target destination device 106 using a MAC address, an IP address, or any other suitable type of identifier. The transfer server 102 may use any information from the header to identify the destination device 106 for the file 103.

At step 208, the transfer server 102 determines an available disk space for the identified destination device 106. In one embodiment, the transfer server 102 may query the destination device 106 about its available disk space. For example, the transfer server 102 may send an information request 115 to destination device 106 to query the destination device 106 about its available disk space. The destination device 106 may send a response 112 to the transfer server 102 that indicates an amount of available disk space for the destination device 106. In another embodiment, the transfer server 102 may be configured to periodically receive information about the amount of available disk space for the destination device 106. The destination device 106 may send available disk space information to the transfer server 102 in real-time or at any suitable predetermined time interval.

At step 210, the transfer server 102 determines whether the available disk space for the destination device 106 is greater than the file size of the file 103. The transfer server 102 makes a determination based on a comparison of the file size of the file 103 and the available disk space for the destination device 106. The transfer server 102 proceeds to step 212 in response to determining that the available disk space for the destination device 106 is greater than the file size of the file 103. Here, the transfer server 102 determines that the destination device 106 has enough available disk space to receive and store the complete file 103.

In one embodiment, the transfer server 102 may send one or more files 103 or documents from a set of files 103 based on the available disk space of the destination device 106 and the file types of the files 103. For example, the transfer server 102 may determine that the destination device 106 does not have enough available disk space to store all of the files 103 from the set of files 103 but the destination device 106 does have enough available disk space to store at least some of the files 103 from the set of files 103. In this example, the transfer server 102 may select one or more files 103 from the set of files 103 based on the importance of their file type as indicated by the metadata 110 associated with the destination device 106. For instance, the set of files 103 may comprise files 103 associated with a financial record file type, an email file type, and a network log file type. The transfer server 102 may determine to send the files 103 associated with the financial record file type to the destination device 106 based on the metadata 110 associated with the destination device 106. This process allows the transfer server 102 to send one or more files 103 to the destination device 106 even when the destination device 106 does not have enough available disk space for a complete set of files 103. In one embodiment, the transfer server 102 may compare the available disk space for the destination device 106 to a user-defined threshold value instead of the file size of the file 103. The user-defined threshold may identify a particular amount or percentage of the disk space. For example, the user-defined threshold may be set to 25% of the total disk space of the destination device 106. In other example, the user-defined threshold may be set to any other suitable value or percentage. In this case, the user-defined threshold value may be set to a value that represents a minimum amount of available disk space that the destination device 106 needs to accept complete files 103. At step 212, the transfer server 102 sends the file 103 to the destination device 106.

Returning to step 210, the transfer server 102 proceeds to step 214 in response to determining that the available disk space for the destination device 106 is less than the file size of the file 103. Here, the transfer server 102 determines that the destination device 106 does not have enough disk space to store the complete file 103. In one embodiment, the transfer server 102 may also proceed to step 214 when the transfer server 102 determines that the available disk space for the destination device 106 is greater than the file size of the file 103 but sending the file 103 to the destination device 106 would reduce the available disk space to a level that negatively impacts the destination device 106. For example, transfer server 102 may proceed to step 214 in response to determining that sending the file 103 to the destination device 106 would prevent the destination device 106 from receiving future important data or files 103. At step 214, the transfer server 102 determines whether the available disk space for the destination device 106 is greater than a minimum threshold value. The minimum threshold value indicates a minimum amount of available disk space for receiving data from the transfer server 102. For example, the minimum threshold value may correspond with a minimum amount of memory resources that the destination device 106 needs to maintain normal operation. The performance of the destination device 106 may degrade or suffer when the destination device 106 has less than the minimum amount of available disk space.

The transfer server 102 proceeds to step 216 in response to determining that the available disk space for the destination device 106 is greater than the minimum threshold value. Here, the transfer server 102 determines that the destination device 106 has enough available disk space to receive at least a portion of the information from the file 103. For example, the transfer server 102 may send a portion of the information from the file 103 to the destination device 106 such that the available disk space of the destination device 106 stays above the minimum threshold value. This allows the destination device 106 to maintain normal operation after receiving data from the transfer server 102. At step 216, the transfer server 102 determines a file type for the file 103. The transfer server 102 may determine a file type for the file 103 based on the format of the file 103 and/or based on the contents within the file 103.

Figure 3:
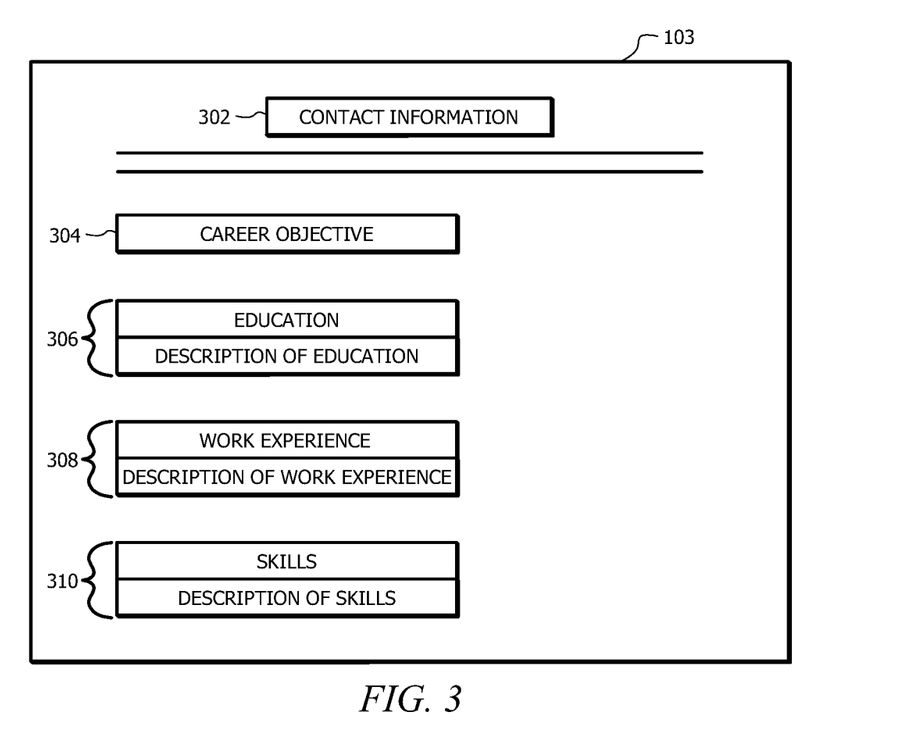
FIG. 3 is an example of a file being analyzed for transmission.

Referring to FIG. 3 as an example, the transfer server 102 may first determine that the file 103 comprises text based on its file format (e.g. a text document). In response to determining that the file contains text, the transfer server 102 may then perform natural language processing on the text within the file 103 to determine a file type for the file 103 based on the content of the text in the file 103. The transfer server 102 may identity keywords, such as "career objective," "education," and "work experience," that indicate the file 103 is likely a resume. In this example, the transfer server 102 may determine that the file 103 is a resume file type. As another example, the transfer server 102 may determine that the file 103 is a spreadsheet that comprises numbers formatted as currency. In this example, the transfer server 102 may determine that the file 103 is a financial record file type. As another example, the transfer server 102 may determine that the file is a database record that comprises numbers formatted as network addresses (e.g. IP addresses or MAC addresses). In this example, the transfer server 102 may determine that the file 103 is a network log file type.

Returning to FIG. 2 at step 218, the transfer server 102 identifies metadata 110 linked with the determined file type. The metadata 110 that is linked with the determined file type may be used to identify which data 107 should be extracted from the file 103. Continuing with the previous example, the metadata 110 linked with a resume file type may instruct the transfer server 102 to extract information associated with the keywords "contact information" and "work experience" from the file 103. In other examples, the metadata 110 may indicate any other types of information or combination of information to extract from the file 103.

In one embodiment, the metadata 110 may indicate a priority associated with different types of information. Continuing with the previous example, the metadata 110 linked with a resume file type may indicate that information associated with the keywords "contact information" and "work experience" corresponds with a high-priority, information associated with "education" and "skill" corresponds with a medium-priority, and information associated with keywords "career objectives" corresponds with a low-priority. By associating priority levels with different types of information, the transfer server 102 can extract different amounts of information based on the amount of available disk space in the destination device 106. For example, the metadata 110 may indicate for the transfer server 102 to only extract high-priority information when the destination device 106 is low on available disk space. As another example, the metadata 110 may indicate for the transfer server 102 to extract high-priority and medium-priority information when the destination device 106 has a sufficient amount of available disk space to store both extract high-priority and medium-priority information. This process allows the transfer server 102 to dynamically adjust the amount of data that is transmitted to the destination device 106 based on its available disk space.

At step 220, the transfer server 102 extracts data 107 from the file 103 corresponding with the metadata 110. Referring to the example in FIG. 3, when the metadata 110 instructs the transfer server 102 to extract information associated with the keywords "contact information" and "work experience," the transfer server 102 may perform natural language processing on the file 103 to identify the corresponding information to extract. For example, the transfer server 102 may scan the text within the file 103 to identify instances of the keywords or synonyms of the keywords identified by the metadata 110. The transfer server 102 may also use natural language processing to parse the text in file 103 to identify any text that is associated with the keywords identified by the metadata 110. In this example, the transfer server 102 may identify and extract information from a contact information section 302 that contains a name, address, email address, and phone number which corresponds with the keyword "contact information." The transfer server 102 also identifies and extracts information from a work experience section 308 that contains job titles, work experience summaries, and dates which correspond with the keyword "work experience." In this example, the transfer server 102 only extracts data 107 associated with the identified metadata 110 and ignores other sections of the file 103 such as a career objective section 304, an education section 306, and a skills section 310. This process allows the transfer server 102 to extract a subset or a portion of the data from the file 103 which reduces the amount of data that is transmitted to the destination device 106. The transfer server 102 may repeat this process for all the documents in the file 103.

In one embodiment, the transfer server 102 may store the extracted data 107 in a new data structure or file 103. For example, the transfer server 102 may compile the extracted data 107 into a new text document 120. As another example, the transfer server 102 may store the extracted data 107 in a new data structure that is in a different format from the original format of the file 103. For instance, the transfer server 102 may compile a spreadsheet that contains the extracted data 107 from a text document.

Returning to FIG. 2 at step 222, the transfer server 102 sends the extracted data 107 to the destination device 106. In one embodiment, the transfer server 102 may store the original file 103 and/or the extracted in data 107 in a database (e.g. database 108 or memory 404). For example, the transfer server 102 may store the complete file 103 in the database 108 after sending the extracted data 107 to the destination device 106. In this example, the transfer server 102 may also send a link for accessing the file 103 to the destination device 106. This process allows the destination device 106 to retrieve or access the complete file 103 at a later time when the amount of available disk space on the destination device 106 increases.

In one embodiment, the transfer server 102 may repeat steps 220 and 222 periodically to extract and send additional information from the file 103. For example, the transfer server 102 may initially extract and send a first portion of data from the file 103 to the destination device 106. After a predetermined time period has elapsed, the transfer server 102 may check whether the available disk space of the destination device 106 to determine whether the available disk space of the destination device 106 has increased to a level that allows the transfer server 102 to send additional data to the destination device 106. If the available disk space of the destination device 106 has increased, the transfer server 102 may extract and send a second portion of data from the file 103 to the destination device 106. Continuing with the previous example, the transfer server 102 may extract and send information associated with the education section 306 or any other section in the file 103 after the transfer server 102 sends the information associated with the contact information section 302 and the work experience section 308.

Returning to step 214, the transfer server 102 proceeds to step 224 in response to determining that the available disk space for the destination device 106 is less than or equal to the minimum threshold value. At step 224, the transfer server 102 stores the file 103 in the database 108. Here, the transfer server 102 determines that the amount of available disk space in the destination device 106 is too low to send the file 103 or extracted data 107 from the file 103. In this case, the transfer server 102 stores the file 103 in a database (e.g. database 108 or memory 404) and sends a link 109 for accessing the file 103 to the destination device 106. This process allows the destination device 106 to retrieve or access the complete file 103 at a later time when the amount of available disk space on the destination device 106 increases.

Transfer Server Hardware Configuration

Figure 4:
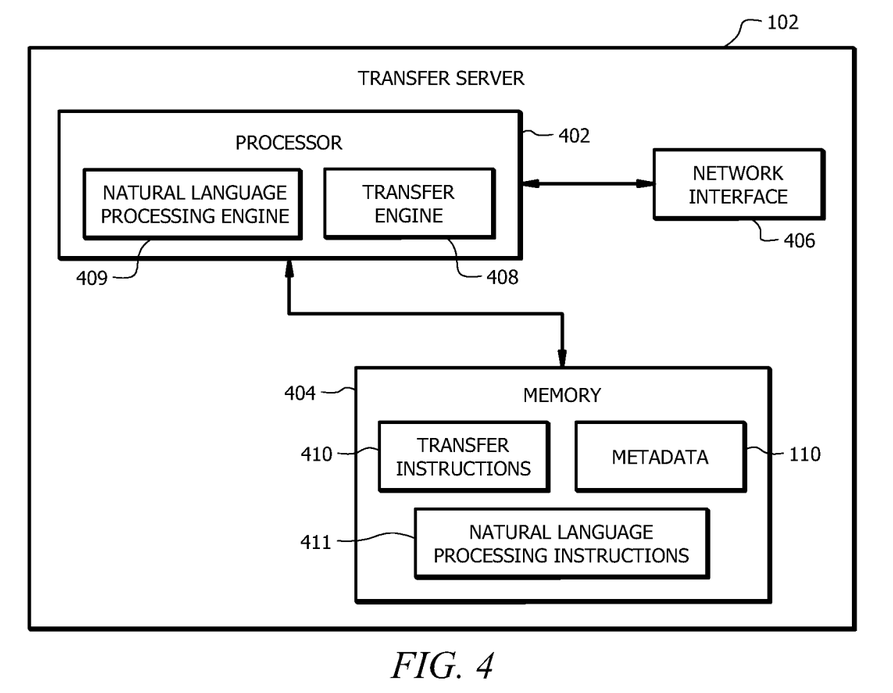
FIG. 4 is an embodiment of a device configured to transfer files using artificial intelligence.

FIG. 4 is an embodiment of a device (e.g. transfer server 102) configured to transfer data (e.g. files 103) using artificial intelligence. The transfer server 102 comprises a processor 402, a memory 404, and a network interface 406. The transfer server 102 may be configured as shown or in any other suitable configuration.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a transfer engine 408 and a natural language processing engine 409. In this way, processor 402 may be a special purpose computer designed to implement the functions disclosed herein. In an embodiment, the transfer engine 408 and the natural language processing engine 409 are implemented using logic units, FPGAs, ASICs, DSPs, or any other suitable hardware. The transfer engine 408 is configured operate as described in FIGS. 1 and 2. The natural language processing engine 409 is configured to perform the natural language processing operations described in FIGS. 1 and 2. For example, the transfer engine 408 may be configured to perform the steps of method 200 in FIG. 2. Although FIG. 4 shows the transfer engine 408 and the natural language processing engine 409 as distinct components, the transfer engine 408 and the natural language processing engine 409 may be implemented as a single engine or component.

The memory 404 comprises one or more disks, tape drives, or solid-state drives, and may be used as an over-flow data storage device, to store programs when such programs are selected for execution, and to store instructions and data that are read during program execution. The memory 404 may be volatile or non-volatile and may comprise read-only memory (ROM), random-access memory (RAM), ternary content-addressable memory (TCAM), dynamic random-access memory (DRAM), and static random-access memory (SRAM).

The memory 404 is operable to store transfer instructions 410, natural language processing instructions 411, metadata 110, and/or any other data or instructions. The transfer instructions 410 and the natural language processing instructions 411 may comprise any suitable set of instructions, logic, rules, or code operable to execute the transfer engine 408 and the natural language processing engine 409, respectively. The metadata 110 is configured similar to the metadata 110 described in FIGS. 1 and 2.

The network interface 406 is configured to enable wired and/or wireless communications. The network interface 406 is configured to communicate data between the transfer server 102 and other devices (e.g. data sources 104, backup data sources 105, databases 108, and/or destination devices 106), systems, or domain. For example, the network interface 406 may comprise a WIFI interface, a LAN interface, a WAN interface, a modem, a switch, or a router. The processor 402 is configured to send and receive data using the network interface 406. The network interface 406 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A file transfer system, comprising: a data source configured to transmit a file;
   a destination device; and
   a transfer server in signal communication with the data source and the destination device, wherein the transfer server comprises:
   a memory operable to store metadata linked with different file types, wherein the metadata identifies types of information in the file; and
   a transfer engine implemented by a processor operably coupled to the memory, configured to:
   receive the file;
   determine a file size of the file;
   determine an available disk space for the destination device;
   compare the available disk space for the destination device to the file size of the file;
   determine that the available disk space for the destination device is less than the file size of the file;
   determine that the available disk space is greater than a minimum threshold value in response to determining that the available disk space for the destination device is less than the file size of the file;
   determine a file type for the file based on content within the file in response to determining that the available disk space is greater than the minimum threshold value;
   identify metadata linked with the determined file type, wherein the metadata identifies keywords and type of information in the file;
   extract a first portion of data from the file corresponding with the keywords and the type of information of the identified metadata;
   send the first portion of data to the destination device;
   wherein the transfer server is further configured to:
   determine a predetermined time period has elapsed after sending the first portion of data to the destination device, wherein an amount of available disk space in the destination device is determined for the predetermined time period in response to determining that the available disk space for the destination device is less than the file size of the file;

extract a second portion of data from the file corresponding with the identified metadata based on the amount of available disk space of the destination device; and send the second portion of data to the destination device.

2. The system of claim 1, wherein the transfer server is further configured to:
store the file in a database in response to determining that the available disk space is not treater than the minimum threshold value; and
send a link for accessing the file to the destination device.

3. The system of claim 1, wherein:
the metadata identifies keywords; and
extracting the first portion of data comprises:
employing natural language processing to identify data within the file associated with the keywords; and
extracting the data associated with the keywords.

4. The system of claim 1, wherein:
the metadata identifies information associated with a high priority based on an amount of available disk space in the destination device in response to determining that the available disk space for the destination device is less than the file size of the file; and
extracting the data comprises:
identifying data within the file that corresponds with the information associated with the high priority; and
extracting the data corresponding with the information associated with the high priority based on the amount of available disk space in the destination device.

5. The system of claim 1, wherein transfer server is further configured to:
determine the file is corrupt; and
send a request to a backup data source for a copy of the file.

6. The system of claim 1, wherein sending the first portion of data to the destination device comprises:
generating a new file that comprises the first portion of data; and
sending the new file to the destination device.

7. The system of claim 6, wherein the new file is a different file format than the received file.

8. A file transfer method, comprising:
receiving, by a transfer server, a file;
determining, by the transfer server, a file size of the file;
identifying, by the transfer server, a destination device for the file;
determining, by the transfer server, an available disk space for the destination device;
comparing, by the transfer server, the available disk space for the destination device to the file size of the file;
determining, by the transfer server, that the available disk space for the destination device is less than the file size of the file;
determining that the available disk space is greater than a minimum threshold value in response to determining that the available disk space for the destination device is less than the file size of the file;
determining, by the transfer server, a file type for the file based on content within the file in response to determining that the available disk space is greater than the minimum threshold value;
identifying, by the transfer server, metadata linked with the determined file type, wherein the metadata identifies keywords and type of information in the file;
extracting, by the transfer server, a first portion of data from the file corresponding with the keywords and the type of information of the identified metadata; and sending, by the transfer server, the first portion of data to the destination device;
determining, by the transfer server, a predetermined time period has elapsed after sending the first portion of data to the destination device,
wherein an amount of available disk space in the destination device is determined for the predetermined time period in response to determining that the available disk space for the destination device is less than the file size of the file;
extracting, by the transfer server, a second portion of data from the file corresponding with the identified metadata based on the amount of available disk space of the destination device; and
sending, by the transfer server, the second portion of data to the destination device.

9. The method of claim 8, further comprising:
storing, by the transfer server, the file in a database in response to determining that the available disk space is not greater than the minimum threshold value; and
sending, by the transfer server, a link for accessing the file to the destination device.

10. The method of claim 8, wherein:
the metadata identifies keywords; and
extracting the first portion of data comprises:
employing natural language processing to identify data within the file associated with the keywords; and
extracting the data associated with the keywords.

11. The method of claim 8, wherein:
the metadata identifies information associated with a high priority based on an amount of available disk space in the destination device in response to determining that the available disk space for the destination device is less than the file size of the file; and
extracting the data comprises:
identifying data within the file that corresponds with the information associated with the high priority; and
extracting the data corresponding with the information associated with the high priority based on the amount of available disk space in the destination device.

12. The method of claim 8, further comprising:
determining, by the transfer server, the file is corrupt; and
sending, by the transfer server, a request to a backup data source for a copy of the file.

13. The method of claim 8, wherein sending the first portion of data to the destination device comprises:
generating a new file that comprises the first portion of data; and
sending the new file to the destination device.

14. The method of claim 13, wherein the new file is a different file format than the received file.

15. A file transfer device, comprising:
a network interface configured to receive a file;
a memory operable to store metadata linked with different file types, wherein the metadata identifies types of information in the file; and
a transfer engine implemented by a processor operably coupled to the network interface and the memory, configured to:
receive the file;
determine a file size of the file;
identify a destination device for the file;
determine an available disk space for the destination device;
compare the available disk space for the destination device to the file size of the file;

determine that the available disk space for the destination device is less than the file size of the file;

determine that the available disk space is greater than a minimum threshold value in response to determining that the available disk space for the destination device is less than the file size of the file;

determine a file type for the file based on content within the file in response to determining that the available disk space is greater than the minimum threshold value;

identify metadata linked with the determined file type, wherein the metadata identifies keywords and type of information in the file;

extract a first portion of data from the file corresponding with keywords and the type of information of the identified metadata; and send the first portion of data to the destination device;

wherein the transfer engine is further configured to:

determine a predetermined time period has elapsed after sending the first portion of data to the destination device, wherein an amount of available disk space in the destination device is determined for the predetermined time period in response to determining that the available disk space for the destination device is less than the file size of the file;

extract a second portion of data from the file corresponding with the identified metadata based on the amount of available disk space of the destination device; and send the second portion of data to the destination device.

16. The device of claim 15, wherein the transfer engine is further configured to:

store the file in a database in response to determining that the available disk space is not treater than the minimum threshold value; and send a link for accessing the file to the destination device.

17. The device of claim 15, wherein:

the metadata identifies keywords; and extracting the first portion of data comprises:

employing natural language processing to identify data within the file associated with the keywords; and extracting the data associated with the keywords.

18. The device of claim 15, wherein:

the metadata identifies information associated with a high priority based on an amount of available disk space in the destination device in response to determining that the available disk space for the destination device is less than the file size of the file; and extracting the first portion of data comprises:

identifying data within the file that corresponds with the information associated with the high priority; and extracting the data corresponding with the information associated with the high priority based on the amount of available disk space in the destination device.

* * * * *